US 9,951,862 B2

(12) United States Patent
Kabata et al.

(10) Patent No.: US 9,951,862 B2
(45) Date of Patent: *Apr. 24, 2018

(54) DRIVE DEVICE, IMAGE FORMING APPARATUS, AND GREASE COMPOSITION

(71) Applicants: Toshiyuki Kabata, Kanagawa (JP);
Kumiko Seo, Kanagawa (JP);
Masahiro Ishida, Kanagawa (JP);
Naoki Matsuda, Kanagawa (JP);
Teruyoshi Tanaka, Kanagawa (JP)

(72) Inventors: Toshiyuki Kabata, Kanagawa (JP);
Kumiko Seo, Kanagawa (JP);
Masahiro Ishida, Kanagawa (JP);
Naoki Matsuda, Kanagawa (JP);
Teruyoshi Tanaka, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,471

(22) Filed: May 22, 2015

(65) Prior Publication Data

US 2015/0345614 A1   Dec. 3, 2015

(30) Foreign Application Priority Data

May 29, 2014   (JP) .................................. 2014-111485
Mar. 9, 2015   (JP) .................................. 2015-045785

(51) Int. Cl.
*C10M 117/02*   (2006.01)
*C10M 115/00*   (2006.01)
(Continued)

(52) U.S. Cl.
CPC ....... *F16H 57/0464* (2013.01); *B65H 3/0669* (2013.01); *C10M 117/04* (2013.01);
(Continued)

(58) Field of Classification Search
CPC ............ F16H 57/0464; F16H 57/0006; C10M 117/04; C10M 2205/066; C10M 2205/046;
(Continued)

(56) References Cited

U.S. PATENT DOCUMENTS 2,846,394 A   8/1958   Brunstrom et al.
3,003,962 A   10/1961   Jordan et al.
(Continued)

FOREIGN PATENT DOCUMENTS

CN   1534217 A   10/2004
CN   1821900 A   8/2006
(Continued)

OTHER PUBLICATIONS

Extended European Search Report dated Oct. 2, 2015.
(Continued)

*Primary Examiner* — Pamela H Weiss
(74) *Attorney, Agent, or Firm* — Harness, Dickey & Pierce, P.L.C.

(57) ABSTRACT

A drive device includes a gear having a hole; a shaft that passes through the hole; and a grease composition that is held in a clearance between the shaft and an inner peripheral surface of the hole. The gear rotates on a peripheral surface of the shaft. At least one of the gear and the shaft is made of a resin. The clearance is in a range of 10 to 110 µm. The grease composition contains a hydrocarbon base oil and lithium soap serving as a thickener. A weight ratio of the hydrocarbon base oil to the lithium soap is in a range of 94.5:5.5 to 96.0:4.0. A consistency of the grease composition is in a range of 360 to 400.

10 Claims, 5 Drawing Sheets

(51) Int. Cl.
| | |
|---|---|
| *F16H 55/17* | (2006.01) |
| *F16H 57/04* | (2010.01) |
| *F16H 57/00* | (2012.01) |
| *G03G 15/00* | (2006.01) |
| *B65H 3/06* | (2006.01) |
| *C10M 117/04* | (2006.01) |

(52) U.S. Cl.
CPC ....... *F16H 57/0006* (2013.01); *G03G 15/757* (2013.01); *B65H 2402/46* (2013.01); *B65H 2402/70* (2013.01); *B65H 2403/40* (2013.01); *B65H 2601/521* (2013.01); *C10M 2205/022* (2013.01); *C10M 2205/046* (2013.01); *C10M 2205/066* (2013.01); *C10M 2207/1245* (2013.01); *C10N 2210/01* (2013.01); *C10N 2220/022* (2013.01); *C10N 2230/76* (2013.01); *C10N 2240/04* (2013.01); *C10N 2240/06* (2013.01); *C10N 2240/203* (2013.01); *C10N 2250/10* (2013.01); *G03G 2221/1657* (2013.01); *Y10T 74/1987* (2015.01)

(58) Field of Classification Search
CPC ......... C10M 2207/1245; B65H 3/0669; Y10T 74/1987; C10N 2250/10; C10N 2240/04; C10N 2210/01; C10N 2240/06; C10N 2220/022; C10N 2240/203; C10N 2230/76; G03G 2221/1657; G03G 15/757
See application file for complete search history.

(56) References Cited

U.S. PATENT DOCUMENTS

| | | | |
|---|---|---|---|
| 5,690,292 A | 11/1997 | Sano | |
| 7,662,885 B2 | 2/2010 | Coffey et al. | |
| 7,759,415 B2 | 7/2010 | Coffey et al. | |
| 8,242,065 B2 * | 8/2012 | Sawaguchi | C10M 169/00 508/181 |
| 9,061,698 B2 | 6/2015 | Wakugawa et al. | |
| 2003/0022797 A1 * | 1/2003 | Oohira | C10M 103/06 508/107 |
| 2003/0081351 A1 | 5/2003 | Parsoneault et al. | |
| 2004/0248688 A1 | 12/2004 | Shimada | |
| 2005/0069357 A1 | 3/2005 | Kabata et al. | |
| 2006/0182474 A1 | 8/2006 | Naito et al. | |
| 2006/0199896 A1 | 9/2006 | Walton et al. | |
| 2006/0213303 A1 | 9/2006 | Shigemi et al. | |
| 2006/0269323 A1 | 11/2006 | Kabata et al. | |
| 2007/0110488 A1 | 5/2007 | Kabata et al. | |
| 2007/0242910 A1 | 10/2007 | Akita et al. | |
| 2008/0069635 A1 | 3/2008 | Maehata et al. | |
| 2008/0089713 A1 | 4/2008 | Ishida et al. | |
| 2008/0226344 A1 * | 9/2008 | Cha | G03G 15/757 399/167 |
| 2009/0182114 A1 | 7/2009 | Kusaka et al. | |
| 2010/0197540 A1 | 8/2010 | Shan et al. | |
| 2010/0239318 A1 | 9/2010 | Maehata et al. | |
| 2011/0007990 A1 | 1/2011 | Kawamura | |
| 2011/0129270 A1 | 6/2011 | Seo et al. | |
| 2011/0152139 A1 | 6/2011 | Akita et al. | |
| 2011/0160105 A1 * | 6/2011 | Tanaka | C10M 129/40 508/144 |
| 2011/0170892 A1 | 7/2011 | Ishida et al. | |
| 2011/0306527 A1 | 12/2011 | Bouffet et al. | |
| 2012/0060633 A1 | 3/2012 | Ishida et al. | |
| 2012/0106881 A1 * | 5/2012 | Akita | C10M 101/02 384/279 |
| 2012/0142566 A1 | 6/2012 | Yamamoto | |
| 2014/0060484 A1 * | 3/2014 | Hiramoto | F02D 11/10 123/337 |
| 2014/0119799 A1 | 5/2014 | Kabata et al. | |
| 2014/0226927 A1 | 8/2014 | Ishii et al. | |
| 2014/0239760 A1 * | 8/2014 | Asai | H02K 7/116 310/83 |
| 2015/0060191 A1 | 3/2015 | Matsuda et al. | |
| 2015/0110517 A1 | 4/2015 | Ishida et al. | |
| 2015/0344809 A1 * | 12/2015 | Kabata | C10M 161/00 508/521 |

FOREIGN PATENT DOCUMENTS

| | | |
|---|---|---|
| CN | 1837651 A | 9/2006 |
| CN | 101213244 A | 7/2008 |
| CN | 101990569 A | 3/2011 |
| CN | 102134523 A | 7/2011 |
| CN | 102348790 A | 2/2012 |
| CN | 102471718 A | 5/2012 |
| CN | 103045334 A | 4/2013 |
| CN | 103727216 A | 4/2014 |
| EP | 1806512 A1 | 7/2007 |
| JP | 9-017148 | 1/1997 |
| JP | 11-167234 | 6/1999 |
| JP | 2001-089778 A | 4/2001 |
| JP | 2001-228660 | 8/2001 |
| JP | 2003-312868 | 11/2003 |
| JP | 2004225809 A | 8/2004 |
| JP | 2005-329849 | 12/2005 |
| JP | 2007-070461 | 3/2007 |
| JP | 2007297449 A | 11/2007 |
| JP | 2008031406 A | 2/2008 |
| JP | 2010-083658 | 4/2010 |
| JP | 2011148908 A | 8/2011 |
| JP | 5054668 B2 | 10/2012 |
| JP | 2013185027 A | 9/2013 |
| JP | 2013-234758 | 11/2013 |
| WO | WO-2010003918 A1 | 1/2010 |
| WO | WO 2010003918 A1 * | 1/2010 ......... C10M 129/40 |
| WO | WO-2013/042715 A1 | 3/2013 |

OTHER PUBLICATIONS

European Search Report dated Oct. 13, 2015 issued in corresponding European Application No. 15168740.7.
Chinese Office Action and English translation thereof dated Feb. 17, 2017 for corresponding Chinese Patent Application No. 201510282249.0.
Infineum SV150 Dissolving Guide, May 2007.
U.S. Office Action dated May 19, 2017 for corresponding U.S. Appl. No. 14/717,403.
U.S. Notice of Allowance dated May 30, 2017 for corresponding U.S. Appl. No. 14/715,784.
Chinese Office Action and English translation thereof dated Jun. 16, 2017.
U.S. Office Action dated Sep. 14, 2017 for corresponding U.S. Appl. No. 14/717,403.
U.S. Notice of Allowance for corresponding U.S. Appl. No. 14/717,403 dated Jan. 22, 2018.

* cited by examiner

DRIVE DEVICE, IMAGE FORMING APPARATUS, AND GREASE COMPOSITION

CROSS-REFERENCE TO RELATED APPLICATIONS

The present application claims priority to and incorporates by reference the entire contents of Japanese Patent Application No. 2014-111485 filed in Japan on May 29, 2014 and Japanese Patent Application No. 2015-045785 filed in Japan on Mar. 9, 2015.

BACKGROUND OF THE INVENTION

1. Field of the Invention

The present invention relates to a drive device and an image forming apparatus that use a grease composition, and the grease composition used for the drive device and the image forming apparatus.

2. Description of the Related Art

Image forming apparatuses employing an electrophotographic process use many drive devices in mechanisms for an image reading process, an image forming process, a transfer process, and a paper conveyance process, for example. Conventional image forming apparatuses are large-sized and handled as precision apparatuses. The image forming apparatuses are, thus, often installed in places apart from people who perform office operations in offices such as dedicated rooms provide for the apparatuses. Sounds generated during the process for forming images by such image forming apparatuses, thus, are not a serious problem. In fact, the start of forming an image is checked by the generated sound and the end of forming the image is recognized by the stop of the sound.

With the progress of downsizing of the image forming apparatuses in recent years, cases have been increased in which the image forming apparatuses are installed in places just near users such as on the user's desks or side desks. A plurality of users often access an image forming apparatus through a local area network (LAN) to instruct the image forming apparatus to form an image using user's personal computers. As a result, the operating rate of the image forming apparatus tends to be increased. Sounds generated by the image forming apparatuses, which have not been a serious problem, can be often hard to bear for the users near the place in which the image forming apparatuses are installed. In addition, offices are quiet these days. Sounds generated from the image forming apparatuses, thus, become more noticeable.

Most of the generation sources of sounds from the image forming apparatuses are the drive devices described above. The drive devices drive objects by transmitting kinetic energy from the driving sources such as motors to the objects through gears and belts, for example. The image forming apparatuses each include many drive devices. In particular, the gears are very important parts for the transmission of the kinetic energy of the driving sources. Such a drive device is usually provided with many gears. A sound is generated from the drive device due to rubbing between tooth flanks of engaged gears, rubbing between a slide bearing and a shaft to which a gear is fixed, and rubbing between a shaft fixed non-rotatably and the gear rotating on the shaft, for example.

As examples the image forming apparatuses that reduce a noise generated by rubbing between the tooth flanks of the gears, image forming apparatuses in Japanese Patent Application Laid-open No. 2010-083658 and Japanese Patent Application Laid-open No. 2003-312868 have been developed that reduce a noise by a grease composition applied on the tooth flanks of the gears. In Japanese Patent Application Laid-open No. 2001-228660, a drive device is disclosed that uses gears having grooves to hold a grease composition for preventing the grease composition from coming off from the tooth flanks. As examples such as the image forming apparatuses and the drive devices described above, conventionally, it has been common practice to apply a grease composition used for reducing a noise mainly on the tooth flanks of gears. It is considered that a slightly hard grease composition containing a solid lubricant such as polytetrafluoroethylene, molybdenum disulfide, graphite, or melamine cyanurate has a high effect of reducing a noise. Such a grease composition prevents a hitting sound from being generated by a direct contact between the gears, and reduces friction and wear between the gears, thereby making it possible to maintain the smooth rotation of the gears. The reason why a slightly hard grease composition, specifically, a grease composition having a low consistency, is used is that an excessively soft grease composition may come off from the tooth flanks by a centrifugal force during the operation of the drive device. Conventionally, it has been considered that a noise from the drive device is mainly generated from the tooth flanks of gears and a noise generated between a shaft and a gear rotating on a peripheral surface of the shaft passing through a hole of the gear is not considerable.

SUMMARY OF THE INVENTION

The present inventors have conducted research to effectively further reduce the noise generated from the drive device, and found that it is very important to prevent a noise generated between the shaft and the gear rotating on the peripheral surface of the shaft passing through the hole of the gear. Generally, the gear rotating on the peripheral surface of the shaft passing through the hole of the gear is often large. It is found that, when such a large gear cannot smoothly rotate, other gears engaged with the gear also rotate irregularly, and the irregularity of rotation is propagated to other gears to cause a large noise from the drive device as a whole.

The gear that cannot smoothly rotate on the peripheral surface of the shaft shortens the operating life of the gear. Specifically, the gear rotating on the peripheral surface of the shaft is usually often made of a plastic material because the plastic material can achieve weight reduction, easy maintenance of parts, and cost reduction, for example. When the shaft passing through the hole of the gear is made of a metallic material, the inner peripheral surface of the gear unstably rotating on the peripheral surface of the shaft is readily worn or damaged. With increasing degree of wear or damage of the inner peripheral surface of the hole of the gear, the gear rotates further unstably, thereby causing a large noise. As a result, the gear needs to be replaced at an early stage before the end of its operating life.

The present inventors have conducted experiments to reduce the wear of the inner peripheral surface of the gear by providing grease compositions between the shaft and the inner peripheral surface of the hole of the gear rotating on the peripheral surface of the shaft in a state in which the shaft passes through the hole of the gear. It has been found that most of the grease compositions containing a solid lubricant mixed as described above provide almost no effect on the rubbing between the hole of the gear and the shaft passing through the hole, and in fact some of the grease compositions often worsen the noise. Most of the grease compositions that worsen the noise reduce the noise when they are applied on the tooth flanks of the gears. The reason why such grease compositions often worsen the noise is that a solid lubricant in a large size is caught to the inner peripheral surface of the hole of the gear or the shaft due to a small clearance between the inner peripheral surface of the hole of the gear and the shaft passing through the hole, thereby hindering the rotation of the gear.

The gear made of a plastic material is inferior to that made of a metallic material (including alloys) in dimensional accuracy after molding. It is, thus, difficult to reduce a dimensional variation of the clearance between the inner peripheral surface of the hole of the gear and the shaft passing through the hole. The solid lubricant having a relatively large size contained in the grease composition is, thus, readily caught to the inner peripheral surface of the hole of the gear or the shaft, thereby hindering the rotation of the gear. As a result, a noise is generated.

An object of the present invention is to provide a drive device, an image forming apparatus, and a grease composition that can prevent the occurrence of a noise while maintaining a smooth rotation of the gear rotating on the peripheral surface of the shaft passing through the hole of the gear.

According to an embodiment, a drive device includes a gear having a hole; a shaft that passes through the hole; and a grease composition that is held in a clearance between the shaft and an inner peripheral surface of the hole. The gear rotates on a peripheral surface of the shaft. At least one of the gear and the shaft is made of a resin. The clearance is in a range of 10 to 110 μm. The grease composition contains a hydrocarbon base oil and lithium soap serving as a thickener. A weight ratio of the hydrocarbon base oil to the lithium soap is in a range of 94.5:5.5 to 96.0:4.0. A consistency of the grease composition is in a range of 360 to 400.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of a drive device and an image forming apparatus according to the present invention.

First, the experiments carried out by the present inventors are described. The present inventors have examined a relation between a hole of a gear and a shaft passing through the hole to conduct research on how to properly maintain a smooth rotation of the gear rotating on a peripheral surface of the shaft passing through the hole of the gear. It has been found that friction between an inner peripheral surface of the hole of the gear and the shaft passing through the hole is ideally in a fluid friction state, and it is important to stably provide the grease composition between the inner peripheral surface of the hole of the gear and the shaft passing through the hole over a long period of time. It has been also found that, when a relatively hard grease composition is applied between the inner peripheral surface of the hole of the gear and the shaft passing through the hole, an extremely small gap is generated therebetween, thereby making it difficult to maintain a smooth rotation of the gear. It has been further found that, when a relatively soft grease composition is applied, the grease composition is present between the inner peripheral surface of the hole of the gear and the shaft passing through the hole immediately after the application, but an extremely small gap is generated therebetween after a long period of time has elapsed. This makes it difficult to maintain a smooth rotation of the gear. The reason why the extremely small gap is generated is that the rotation of the gear on the peripheral surface of the shaft accelerates an outflow of the soft grease composition.

The present inventors conducted experiments as follows.

A grease composition 1 was prepared by the following formulation:

Synthetic oil having a viscosity of 24 mm$^2$/s: 74% by weight

Lithium soap: 9% by weight

Polytetrafluoroethylene (PTFE): 5% by weight

Molybdenum disulfide: 4% by weight

Melamine cyanurate: 8% by weight

The consistency (determined by Japanese industrial Standards (JIS) K2220) of the grease composition 1 was 300.

A grease composition 2 was prepared by the following formulation:

Synthetic oil having a viscosity of 12 mm$^2$/s: 90% by weight

Lithium soap: 3.8% by weight

Styrene additive: 6.2% by weight

The consistency of the grease composition 2 was 370.

Figure 1:
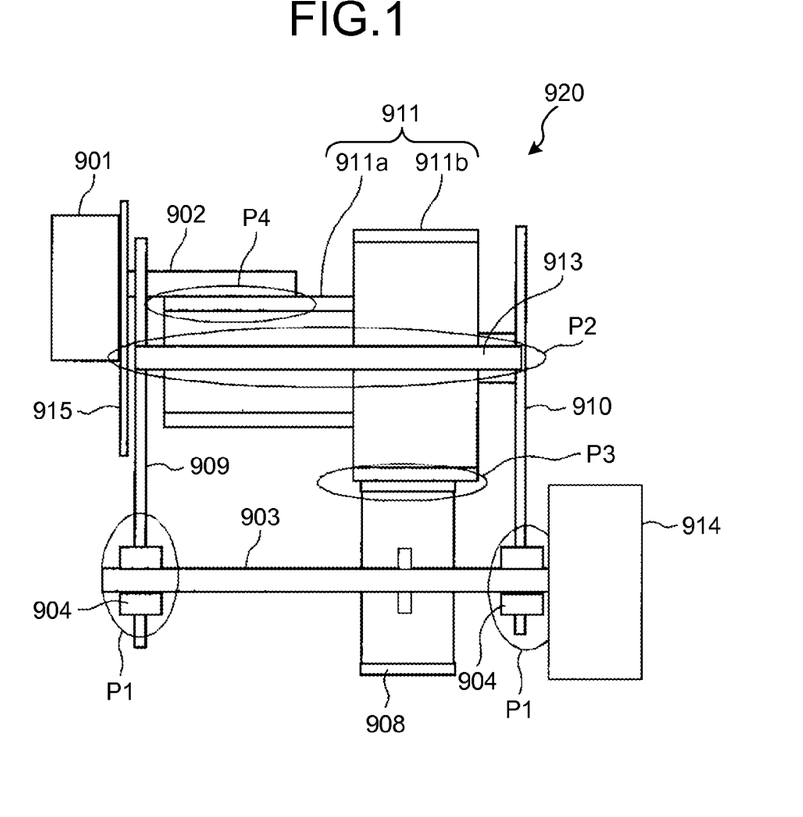
FIG. 1 is a schematic structural diagram illustrating a drive device for testing used in experiments.

FIG. 1 is a schematic structural diagram illustrating a test drive device 920 used for the experiments. In the test drive device 920, slide bearings 904 are provided to each of a first side plate 909 and a second side plate 910. A second gear 908 is fixed to a shaft 903 passing through the two slide bearings 904. A fixed shaft 913 extended between the first side plate 909 and the second side plate 910 is unrotatably fixed thereto. A first gear 911 having a through hole is mounted on the fixed shaft 913. The fixed shaft 913 rotatably supports the first gear 911. The first gear 911 has a driving gear portion 911a and a driven gear portion 911b, both of which rotate around the same axial line and are integrally formed.

To one end of the shaft 903 that is rotatably supported by the slide bearing 904, an object 914 to be driven is fixed. A motor gear 902 engages with the driving gear portion 911a of the first gear 911. A rotational driving force of the motor gear 902 is transmitted to the object 914 to be driven through the first gear 911, the second gear 908, and the shaft 903.

The specifications of the individual elements of the test drive device 920 are illustrated in Table 1.

TABLE 1

|  | | First gear | | |
|---|---|---|---|---|
|  | Motor gear | Driving gear portion | Driven gear portion | Second gear |
| Material | SUS | POM | POM | POM |
| Number of teeth | 13 | 62 | 58 | 70 |
| Module |  | 0.4 |  | 0.6 |
| Torsion angle [°] |  | 16 |  | 16 |
| Engaging tooth width [mm] |  | 12 |  | 8 |
| Shaft diameter [mm] | — |  | φ6 | φ6 |
| Material of slide bearing |  |  |  | POM |
| Clearance [mm] |  |  | 0.05 | 0.05 |

POM: Polyoxymethylene, known as polyacetal resin

In the test drive device 920, a clearance was measured between the first gear 911 and the fixed shaft 913 passing through the through hole of the first gear 911. Specifically, the diameter of the through hole of the first gear 911 was measured over the entire circumference, and the maximum value and the minimum value thereof were obtained. The diameter of the fixed shaft 913 was measured over the entire circumference of the shaft, and the maximum value and the minimum value thereof were obtained. Next, a clearance maximum value was obtained as a result of subtracting the minimum value of the diameter of the fixed shaft 913 from the maximum value of a hole diameter of the first gear 911. A clearance minimum value was obtained as a result of subtracting the maximum value of the diameter of the fixed shaft 913 from the minimum value of the hole diameter of the first gear 911. Both of the maximum value and the minimum value were obtained in a micrometer unit and rounded off the first decimal point. Results of both values coincide with each other, that is, 40 [μm]. In other experiments described below, the clearance was measured in the same way, and the value obtained by rounding off the first decimal point of the maximum value coincides with the value obtained by rounding off the first decimal point of the minimum value.

A motor 901 rotated at 2900 rpm under the condition in which no grease composition was applied to the test drive device 920. After 150 seconds, a noise generated from the whole of the device was measured as noise when no grease was applied.

In the following description, the experiment condition showing a relatively favorable result is referred to as an "Example", while the experiment condition showing an unfavorable result is referred to as a "Comparative example".

COMPARATIVE EXAMPLE 1

The grease composition 1 was applied between the inner peripheral surface of the hole of the first gear 911 and the fixed shaft 913 passing through the hole, the motor 901 rotated at 2900 rpm. After four minutes, a noise generated from the whole of the device was measured. The measurement result was subtracted from the noise without grease. The resulting value was obtained as a noise improvement amount. When the resulting value is negative, the value was not the noise improvement amount but was actually a noise deterioration amount.

EXAMPLE 1

The grease composition 2 was applied between the inner peripheral surface of the hole of the first gear 911 and the fixed shaft 913, and the motor 901 rotated at 2900 rpm. After four minutes, a noise generated from the whole of the device was measured. The measurement result was subtracted from the noise without grease. The resulting value was obtained as a noise improvement amount.

EXAMPLE 2

A noise improvement amount was obtained under the same conditions as Example 1 except that the shaft used in Example 1 was replaced with the shaft the clearance between which and the inner peripheral surface of the hole of the first gear 911 was 10 μm.

COMPARATIVE EXAMPLE 2

A noise improvement amount was obtained under the same conditions as Comparative example 1 except that the shaft used in Comparative example 1 was replaces with the shaft the clearance between which and the inner peripheral surface of the hole of the first gear 911 was 10 μm.

COMPARATIVE EXAMPLE 3

A noise improvement amount was obtained under the same conditions as Example 1 except that the shaft used in Example 1 was replaced with the shaft the clearance between which and the inner peripheral surface of the hole of the first gear 911 was 7 μm.

COMPARATIVE EXAMPLE 4

A noise improvement amount was obtained under the same conditions as Comparative example 1 except that the shaft used in Comparative example 1 was replaces with the shaft the clearance between which and the inner peripheral surface of the hole of the first gear 911 was 7 μm.

The results are illustrated in Table 2.

TABLE 2

|  | Clearance [μm] | Grease | Noise improvement amount [dB] |
|---|---|---|---|
| Example 1 | 17 | Grease 2 | 0.5 |
| Example 2 | 10 | Grease 2 | 0.2 |
| Comparative Example 1 | 17 | Grease 1 | −0.4 |
| Comparative Example 2 | 10 | Grease 1 | −0.5 |
| Comparative Example 3 | 7 | Grease 2 | −0.4 |
| Comparative Example 4 | 7 | Grease 1 | −1.5 |

From the results, it was found that the noise can be effectively reduced by using a grease composition having a relatively large consistency and increasing the clearance to a relatively large value.

Next, grease compositions 3 to 12 were prepared in accordance with the formulations illustrated in Table 3. When the styrene additive was used for a base grease composition containing base oils and lithium soap, the mixture of the base oils and the styrene additive uniformly dispersed in the base oils in advance and additives were added, and then resulting mixture was stirred so as to prepare a lubricant grease composition.

TABLE 3

| | Grease | | | | | | | | | |
|---|---|---|---|---|---|---|---|---|---|---|
| | 3 | 4 | 5 | 6 | 7 | 8 | 9 | 10 | 11 | 12 |
| Base oil a | 89.6 | 80.8 | 81.3 | 80.4 | 83.7 | 85.0 | — | 42.5 | 91.9 | 89.9 |
| Base oil b | — | — | — | — | — | — | 82.3 | 49.4 | — | — |
| Lithium soap | 4.8 | 4.2 | 3.7 | 4.6 | 3.7 | 5.0 | 7.7 | 3.7 | 3.7 | 1.2 |
| Olefin resin powder | — | 9.4 | 9.4 | 9.4 | 7.0 | 9.4 | 9.4 | — | — | — |
| Styrene additive | 5.0 | 5.0 | 5.0 | 5.0 | 5.0 | — | — | 3.8 | 3.8 | 8.3 |
| Antioxidant | 0.5 | 0.5 | 0.5 | 0.5 | 0.5 | 0.5 | 0.5 | 0.5 | 0.5 | 0.5 |
| Corrosion inhibitor | 0.1 | 0.1 | 0.1 | 0.1 | 0.1 | 0.1 | 0.1 | 0.1 | 0.1 | 0.1 |
| Viscosity of base oil [m$^2$/s] | 18 | 18 | 18 | 18 | 18 | 18 | 9850 | 533 | 18 | 18 |
| *Rate of lithium soap [wt %] | 5.1 | 4.9 | 4.4 | 5.4 | 4.2 | 5.6 | 8.6 | 3.9 | 3.9 | 1.3 |
| Consistency | 394 | 376 | 396 | 361 | 394 | 448 | 358 | 357 | 455 | 402 |

*Lithium soap/(Hydrocarbon base oil + Lithium soap)

The specific substances of the respective components illustrated in Table 3 are as follows:
Base oil a: poly-α-olefin (18 mm$^2$/s at 40° C.)
Base oil b: ethylene-α-olefin oligomer (9850 mm$^2$/s at 40° C.)
Lithium soap: lithium 12-hydroxystearate
Olefin resin powder: polyethylene powder (average particle diameter of 12 μm)
Styrene additive: hydrogenated styrene-isoprene block copolymer (styrene content of 36% by weight)
Antioxidant: Adekastab QL manufactured by ADEKA Corporation.
Corrosion inhibitor: Irgamet 39 manufactured by BASF
The values of the base oil viscosity, the consistency, and the lithium soap rate in Table 3 were measured by the following manner:
Base oil viscosity: a kinematic viscosity at 40° C. measured according to JIS K 2283
Consistency: mixture consistency measured according to JIS K 2220.
Lithium soap rate: a rate of the lithium soap weight to the total weight of the base oils and the lithium soap

EXAMPLE 3

A noise improvement amount was obtained under the same conditions as Example 1 except that the shaft used in Example 1 was replaces with the shaft the clearance between which and the inner peripheral surface of the hole of the first gear 911 was 55 μm, and the grease composition 3 was used instead of the grease composition 2.

EXAMPLE 4

A noise improvement amount was obtained under the same conditions as Example 1 except that the shaft used in Example 1 was replaced with the shaft the clearance between which and the inner peripheral surface of the hole of the first gear 911 was 80 μm, and the grease composition 3 was used instead of the grease composition 2.

EXAMPLE 5

A noise improvement amount was obtained under the same conditions as Example 1 except that the shaft used in Example 1 was replaces with the shaft the clearance between which and the inner peripheral surface of the hole of the first gear 911 was 110 μm, and the grease composition 3 was used instead of the grease composition 2.

COMPARATIVE EXAMPLE 5

A noise improvement amount was obtained under the same conditions as Example 1 except that the shaft used in Example 1 was replaced with the shaft the clearance between which and the inner peripheral surface of the hole of the first gear 911 was 130 μm, and the grease composition 3 was used instead of the grease composition 2.

The results are illustrated in Table 4.

TABLE 4

| | Clearance [μm] | Grease | Noise improvement amount [dB] |
|---|---|---|---|
| Example 3 | 55 | Grease 3 | 0.7 |
| Example 4 | 80 | Grease 3 | 0.5 |
| Example 5 | 110 | Grease 3 | 0.2 |
| Comparative example 5 | 130 | Grease 3 | 0.0 |

From the results illustrated in Tables 2 and 4, it was found that the clearance needs to be set in a range of 10 to 110 μm in order to effectively reduce the noise.

EXAMPLES 5 TO 8 AND COMPARATIVE EXAMPLES 6 TO 10

The shaft the clearance between which and the inner peripheral surface of the hole of the first gear 911 was 55 μm was used as the fixed shaft 913 in the same manner as in Example 3. Nothing was provided between the inner peripheral surface of the hole of the first gear 911 and the fixed shaft 913, and the motor 901 rotated at 2500 rpm. After two minutes, a noise generated from the whole of the device was measured. Then, the grease composition 4 was applied between the inner peripheral surface of the hole of the first gear 911 and the fixed shaft 913, and the motor 901 rotated at 2500 rpm. After 90 minutes, a noise generated from the whole of the device was measured as a noise when no grease composition was applied. The measurement result was subtracted from the noise when no grease was applied. The resulting value was obtained as the noise improvement amount. A noise improvement amount was obtained also for each of the grease compositions 5 to 12 in the same manner as described above.

The results are illustrated in Table 5.

TABLE 5

| | Grease | Base oil viscosity | Rate of lithium soap | Consistency | Noise improvement amount [dB] |
|---|---|---|---|---|---|
| Example 5 | Grease 4 | 18 | 4.9 | 376 | 0.7 |
| Example 6 | Grease 5 | 18 | 4.4 | 396 | 0.7 |
| Example 7 | Grease 6 | 18 | 5.4 | 361 | 0.6 |
| Example 8 | Grease 7 | 18 | 4.2 | 394 | 0.4 |
| Comparative example 6 | Grease 8 | 18 | 5.6 | 448 | 0.0 |
| Comparative example 7 | Grease 9 | 9850 | 8.6 | 358 | −0.1 |
| Comparative example 8 | Grease 10 | 533 | 3.9 | 357 | −0.2 |
| Comparative example 9 | Grease 11 | 18 | 3.9 | 455 | −0.1 |
| Comparative example 10 | Grease 12 | 18 | 1.3 | 402 | −0.1 |

EXAMPLES 9 TO 11, AND COMPARATIVE EXAMPLES 11 AND 12

The shaft the clearance between of which and the inner peripheral surface of the hole of the first gear 911 was 55 μm was used as the fixed shaft 913 in the same manner as in Example 3. Nothing was provided between the inner peripheral surface of the hole of the first gear 911 and the fixed shaft 913, and the motor 901 rotated at 3000 rpm. After three minutes, a noise generated from the whole of the device was measured as a noise when no grease was applied. Next, the grease composition was applied to a first portion P1 and a second portion P2 of the test drive device 920. The first portion P1 is a part between the slide bearing 904 and the shaft 903. The second portion P2 is a part between the fixed shaft 913 and the inner peripheral surface of the hole of the first gear 911. After the grease composition was applied to the first portion P1 and the second portion P2, the motor 901 rotated at 3000 rpm. After 50 minutes, a noise generated from the whole of the device was measured. Then, the measurement result was subtracted from the noise when no grease was applied. The resulting value was obtained as the noise improvement amount was obtained. As the grease composition, the grease composition 4 was used in Example 9, the grease composition 5 was used in Example 10, and the grease composition 6 was used in Example 11. The grease composition 1 was used in Comparative example 11, and the grease composition 9 was used in Comparative example 12.

The results of the experiments are illustrated in Table 6.

TABLE 6

| | Grease | Base oil viscosity | Rate of lithium soap | Consistency | Noise improvement amount [dB] |
|---|---|---|---|---|---|
| Example 9 | Grease 4 | 18 | 4.9 | 376 | 1.6 |
| Example 10 | Grease 5 | 18 | 4.4 | 396 | 1.5 |
| Example 11 | Grease 6 | 18 | 5.4 | 361 | 1.6 |

TABLE 6-continued

| | Grease | Base oil viscosity | Rate of lithium soap | Consistency | Noise improvement amount [dB] |
|---|---|---|---|---|---|
| Comparative example 11 | Grease 1 | 24 | 10.8 | 300 | −0.6 |
| Comparative example 12 | Grease 9 | 9850 | 8.6 | 358 | −0.4 |

From the results illustrated in Tables 4 and 6, it was found that the following grease composition needs to be used to effectively reduce the noise. That is, used is the grease composition in which a weight ratio of the hydrocarbon base oil to the lithium soap (hydrocarbon base oil : lithium soap) is in a range of 94.5:5.5 to 96.0:4.0, and the consistency is in a range of 360 to 400.

EXAMPLES 12 TO 14 AND COMPARATIVE EXAMPLE 13

A noise improvement amount was obtained in the same manner as in Example 9 except that the grease composition 4 was applied to a third portion P3 and a fourth portion P4 in addition to the first portion P1 and the second portion P2. This experiment was Example 12. The third portion P3 is the tooth flank of the driven gear portion 911b of the first gear 911 and the tooth flank of the second gear. The fourth portion P4 is the tooth flank of the motor gear 902 and the tooth flank of the driving gear portion 911a of the first gear 911.

A noise improvement amount was obtained in the same manner as in Example 10 except that the grease composition 5 was applied to the third portion P3 and the fourth portion P4 in addition to the first portion P1 and the second portion P2. This experiment was Example 13. The noise improvement amount was obtained in the same manner as in Example 11 except that the grease composition 6 was applied to the third portion P3 and the fourth portion P4 in addition to the first portion P1 and the second portion P2. This experiment was Example 14. The noise improvement amount was obtained in the same manner as in Comparative example 11 except that the grease composition 1 was applied to the third portion P3 and the fourth portion P4 in addition to the first portion P1 and the second portion P2. This experiment was Comparative example 13.

The results of the experiments are illustrated in Table 7. From the comparison with Table 6, it is understand that the application of the grease compositions on the tooth flank of the gears can further effectively reduce the noise.

TABLE 7

| | Grease | Base oil viscosity | Rate of lithium soap | Consistency | Noise improvement amount [dB] |
|---|---|---|---|---|---|
| Example 12 | Grease 4 | 18 | 4.9 | 376 | 3.0 |
| Example 13 | Grease 5 | 18 | 4.4 | 396 | 2.9 |
| Example 14 | Grease 6 | 18 | 5.4 | 361 | 2.5 |
| Comparative example 13 | Grease 1 | 24 | 10.8 | 300 | 0.8 |

EXAMPLES 15 TO 16 AND COMPARATIVE EXAMPLE 14

A bracket 915 that fixes the motor 901 and has a plate thickness of 1.6 mm was changed to one having a plate thickness of 1.0 mm. In the improved device after the change, a grease composition was applied to all of the first portion P1, the second portion P2, the third portion P3, and the fourth portion P4, and a noise was measured. The measurement result was subtracted from the noise when no grease composition was applied and the bracket 915 having a plate thickness of 1.6 mm was used. The resulting value was obtained as a noise improvement amount. The experiment condition using the grease composition 4 was Example 15, the experiment condition using the grease composition 5 was Example 16, and the experiment condition using the grease composition 1 was Comparative example 14. The noise improvement amount of Example 15 was 2.0 dB. The noise improvement amount of Example 16 was 1.6 dB. The noise improvement amount of Comparative example was −0.6. It was found that the condition in which the grease composition was applied and the bracket 915 having a smaller thickness was used was able to reduce the noise lower than the condition in which no grease composition was applied and a firm and strong bracket 915 having a plate thickness of 1.6 mm was used.

EXAMPLES 17 AND 18

As an image forming apparatus, IPSiO SP4310 manufactured by Ricoh Company, Ltd. was prepared. A noise generated from the image forming apparatus was measured as the noise when no grease was applied. Thereafter, the grease composition 4 was applied between the clearances between all of the slide bearings provided in an image formation unit and the shafts passing through the slide bearings in the image forming apparatus excluding a fixing device. The grease composition was also applied to 75% of all tooth flanks excluding the fixing device. A noise generated from the whole of the apparatus was measured after a test image was output on 100,000 pieces of recording sheets under an environment of 28° C. and 75% RH, and thereafter a noise improvement amount was obtained (Example 17). As another experiment, a noise improvement amount was obtained in the same manner as in Example 17 except that the grease composition 5 was used instead of the grease composition 4 (Example 18). The noise improvement amount was 4.5 dB in both Example 17 and Example 18, which were favorable results.

As described above, it was found that the noise can be effectively reduced when the clearance between the inner peripheral surface of the hole of the gear rotating on the peripheral surface of the shaft passing through the hole and the shaft passing through the hole is set in a range of 10 to 110 μm and the grease composition having a consistency in a range of 360 to 400 is applied to the clearance. In addition, it was found that the noise can be effectively reduced also when the grease composition is used that contains a hydrocarbon base oil (A) and lithium soap (B) serving as a thickener, and the ratio of (A) to (B) is in a range of 94.5:5.5 to 96.0:4.0.

The drive device according to the present invention includes a gear having a hole; a shaft passing through the hole; and a grease composition held in a clearance between an inner peripheral surface of the hole and the shaft. The gear rotates on the peripheral surface of the shaft. At least one of the slide bearing and the shaft is made of a resin. The clearance is in a range of 10 to 110 μm. The grease composition contains the hydrocarbon base oil and the lithium soap as the thickener. The weight ratio of the hydrocarbon base oil to the lithium soap (hydrocarbon base oil : lithium soap) is adjusted in a range of 94.5:5.5 to 96.0:4.0. The consistency is adjusted in a range of 360 to 400.

The drive device according to the present invention transmits rotational energy of the driving motor to an object to be driven through a plurality of gears so as to drive the object to be driven. Belts or pulleys may be provided in addition to the gears as needed. The number of objects to be driven is basically one, but multiple objects may be driven. The drive device according to the present invention may drive the object to be driven at an appropriate speed by reducing or increasing the rotational speed of the driving motor through the gears.

The drive device according to the present invention includes at least one gear having a hole and rotating on a fixed shaft in a state in which the fixed shaft is inserted into the through hole. In addition to the gear, another gear that is fixed to a shaft passing through a slide bearing and rotates with the shaft may be provided.

The drive device according to the present invention includes at least one set of the gear having the hole and the shaft passing through the hole, at least one of the gear and the shaft being made of a resin. At least one of the gear and the shaft passing through the hole of the gear is made of a resin that achieves a light weight and has excellent workability, thereby making it possible to provide a compact, lightweight, and low cost drive device.

Any metallic materials and resin materials can be used for the material of the shaft (that passes through the hole of the gear) used in the drive device according to the present invention. In view of causing the shaft to exert strength required to maintain smooth rotation of the gear while receiving a force applied to the gear, a metallic material is preferably used. In view of durability, workability, and cost, a stainless steel or a free-cutting steel is especially preferred.

Any metallic materials and resin materials can be used for the material of the gear having the hole in the drive device according to the present invention. In view of lightweight property and cost, resin materials are preferably used. Examples of the resin materials include a fluororesin, a polyacetal resin, a polyphenylene sulfide resin, and a polyether ether ketone resin. In view of durability and cost, the polyacetal resin is most preferred.

The clearance between the inner peripheral surface of the hole of the gear used in the drive device according to the present invention and the shaft passing through the hole is in a range of 10 to 110 μm, preferably 20 to 100 μm and more preferably 25 to 90 μm. When the clearance is smaller than 10 μm, the gear or the shaft is readily damaged due to the contact therebetween in assembly and in being driven, thereby causing the rotation of the gear to be unstable. As a result, unfavorably, a noise becomes large and the durability of the gear or the shaft is reduced. When the clearance is larger than 110 μm, the gear rotates unstably. As a result, unfavorably, a noise becomes large and the durability of the gear is reduced.

Figure 2:
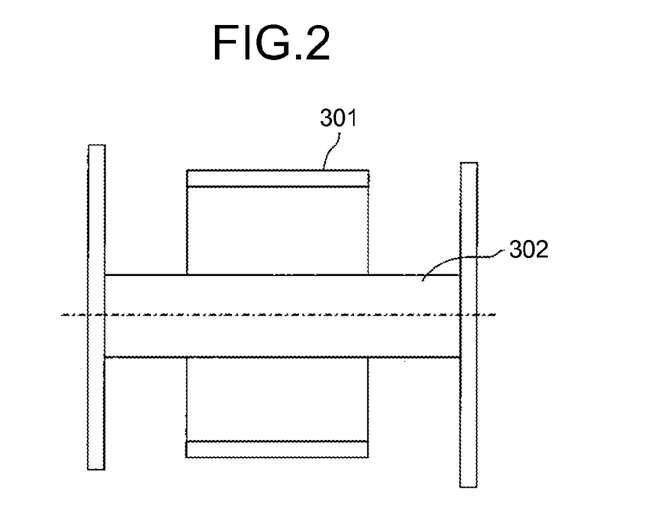
FIG. 2 is a main structural diagram illustrating a main part of the drive device according to an embodiment.

FIG. 2 is a main structural diagram illustrating a main part of the drive device according to the embodiment. The drive device according to the embodiment includes at least, as illustrated in FIG. 2, a shaft 302 that is unrotatably fixed and a gear 301 rotating on a peripheral surface of the shaft 302 passing through a hole of the gear 301. The shaft 302 is extended between two side plates and unrotatably fixed thereto. The drive device includes one or more sets of the gear 301 and the shaft 302.

A grease composition (hereinafter, also referred to as a grease composition according to the embodiment) is provided between the inner peripheral surface of the hole of the gear 301 and the shaft 302. The grease composition contains a hydrocarbon base oil (A) and lithium soap (B) as serving a thickener. The ratio of the hydrocarbon base oil (A) to the lithium soap (B) is in a range of 94.5:5.5 to 96.0:4.0. The consistency of the grease composition is in a range of 360 to 400. The shaft 302 is supported by a fluid oil film pressure produced by the grease composition provided between the inner peripheral surface of the hole of the gear 301 and the shaft 302, resulting in the shaft 302 being very smoothly rotated without receiving a frictional resistance. As a result, a noise is hardly generated. Consequently, the semi-permanent operating lives of the gear 301 and the shaft 302 can be achieved.

When the drive device according to the embodiment is provided with a plurality of combinations of the gear 301 rotating on the peripheral surface of the shaft 302 passing through the hole of the gear 301 and the shaft 302 passing through the hole (hereinafter, the combination is referred to as "gear-shaft set"), the grease composition is preferably provided between the shaft 302 and the inner peripheral of the hole of the gear 301 in all of the gear-shaft sets. In the gear-shaft set including the gear 301 that rotates at a relatively low speed and receives small torque, the grease composition may not be provided between the shaft 302 and the inner peripheral surface of the hole of the gear 301 in view of the cost. In at least one out of all the "gear-shaft sets", the grease composition is provided between the shaft 302 and the inner peripheral surface of the hole of the gear.

The drive device according to the embodiment includes gears (not illustrated) in addition to the gear 301 illustrated in FIG. 2. The grease composition according to the embodiment is preferably applied to the tooth flanks of such the gears to obtain an effect of being capable of further reducing a noise generated from the drive device. A grease composition generally used for preventing a noise, which differs from the grease composition according to the embodiment, may be used as the grease composition applied to the tooth flank. However, if the grease composition generally used for preventing a noise is erroneously provided between the shaft 302 and the inner peripheral surface of the hole of the gear 301, a noise is probably worsened. Thus, very careful attention needs to be paid so as to prevent the erroneous use of the grease composition in the assembly process of the drive device. The grease composition according to the embodiment exhibit an excellent effect on reducing a noise between the tooth flanks even when the grease composition is applied to the tooth flanks of the gears and used. Accordingly, in view of simplification of the assembly process of the drive device and the noise prevention, the grease composition according to the embodiment is preferably applied to the tooth flanks.

As described above, the consistency of the grease composition according to the embodiment is in a range of 360 to 400, and preferably in a range of 365 to 395. The grease composition having a consistency smaller than 360 is hardly provided uniformly between the shaft 302 and the inner peripheral surface of the hole of the gear 301, and thus hardly maintains the fluid oil film pressure uniformly. As a result, the grease composition unfavorably causes a noise to become larger and may reduce the durability of the gear 301 and the shaft 302. The grease composition having a consistency larger than 400 may unfavorably behave in the following ways where the clearance between the shaft 302 and the inner peripheral surface of the hole of the gear 301 is in a range of 10 to 110 μm. With the progress of the operation of the drive device, the grease composition flows from the clearance between the shaft 302 and the inner peripheral surface of the hole of the gear 301 to the outside of them, thereby causing the fluid oil film pressure to be difficult to be maintained uniformly. As a result, a noise becomes larger and the durability of the gear 301 and the shaft 302 is reduced. When the grease composition having a consistency larger than 400 is applied to the tooth flanks of the gears in the drive device for the purpose of further reduction of a noise or further increase in durability of the gears, the grease composition tends to be readily scattered from the tooth flanks of the gears with the progress of the operation of the drive device. As a result, unfavorably, it becomes difficult to maintain an effect of reducing a noise or increasing the durability of the gears over a long period of time in addition to the contamination of the drive device and the peripheral device due to the scattered grease composition. The consistency of the grease composition is measured in accordance with JIS K 2220.

In the grease composition according to the embodiment, the ratio of the hydrocarbon base oil (A) to the lithium soap (B) serving as a thickener is in a range of 94.5:5.5 to 96.0:4.0. When the ratio of the amount of the thickener to that of the base oil is larger than the range described above, the grease composition becomes hard and may increase a resistance to stirring. When the ratio of the amount of the thickener to that of the base oil is smaller than the range, the grease composition softens and unfavorably may leak from the clearance.

Any hydrocarbon base oils can be used as the hydrocarbon base oil of the grease composition according to the embodiment regardless of the types of mineral oils and synthetic oils or regardless of being used singly or as a mixture. Examples of the hydrocarbon base oils include mineral oils typified by a paraffin-based oil and a naphthene-based oil, ester synthetic oils typified by diester and polyol ester, olefin synthetic oils typified by poly-α-olefin, α-olefin oligomer, polybutene, and polyisobutylene, and ester synthetic oils typified by alkylene diphenyl ether and polyalkylene ether. The olefin synthetic oils are preferable that cause relatively little damage on the resin material and have an excellent balance between heat resistance and low temperature property. These base oils can be singly used or as a combination of two or more oils. The kinetic viscosity of the base oil is preferably equal to or smaller than 20 mm$^2$/s at 40° C. in order to rotate the gears smoothly and reduce a noise of the whole of the drive device.

Any lithium soap can be used as the thickener of the grease composition according to the embodiment regardless of being used singly or as a mixture. Examples of the lithium soap include lithium salts of monocarboxylic fatty acid or hydroxy monocarboxylic fatty acid and lithium salts of a vegetable oil such as a seed oil and an animal oil used for manufacturing lithium soap or fatty acids derived from the oils. The lithium salt of monocarboxylic fatty acid or hydroxy monocarboxylic fatty acid is preferable. In particular, the lithium salt of monocarboxylic fatty acid or hydroxy monocarboxylic fatty acid having 8 to 12 carbon atoms is preferable. More specifically, examples of the lithium salt of monocarboxylic fatty acid include the lithium salts of lauric acid, myristic acid, palmitic acid, stearic acid, behenic acid, myristoleic acid, palmitoleic acid, oleic acid, and linoleic acid, while examples of the lithium salt of hydroxy monocarboxylic fatty acid include the lithium salts of 12-hydroxystearic acid, 14-hydroxystearic acid, 16-hydroxystearic acid, 6-hydroxystearic acid, and 9,10-hydroxystearic acid. Furthermore, straight-chain monocarboxylic fatty acid or straight-chain hydroxy monocarboxylic fatty acid, which has an excellent durability with respect to the lubrication portion composed of a metallic member and a resin member, is preferable. More specifically, lithium stearate or lithium 12-hydroxystearate is preferably used.

To the grease composition according to the embodiment, additives typically mixed may be added besides the hydrocarbon base oil and the lithium soap depending on the intended use. Examples of the additives include a solid lubricant, a thickener, an antioxidant, an extreme-pressure additive, an oily additive, a rust preventive agent, a corrosion inhibitor, a metal deactivator, dyes, a hue stabilizer, a viscosity-index improving agent, and a structure stabilizer. In particular, a solid lubricant preferably added so as to prevent poor lubrication due to oil film shortage, rotate the gears smoothly, reduce a noise of the whole of the drive device, and increase the durability. Any solid lubricants can be used regardless of being used singly or as a mixture. Examples of the solid lubricant include layered compounds typified by melamine cyanurate, molybdenum disulfide, boron nitride, graphite, mica, and graphite fluoride, fluororesins typified by polytetrafluoroethylene (PTFE), tetrafluoroethylene-perfluoroalkylvinylether copolymer (PFA), tetrafluoroethylene-hexafluoropropylene copolymer (FEP), ethylene-tetrafluoroethylene copolymer (ETFE), polyvinylidene difluoride (PVDF), and polychlorotrifuruoroethylene (PCTFE), metal oxides typified by titanium dioxide and zinc oxide, and powder of synthetic resins typified by polyolefin and polyamide. In order to cause the gears and the shaft to continue the smooth rotation, the olefin resin powder is preferably used as the solid lubricant because the olefin resin powder is readily dispersed in a very soft grease composition having a consistency ranging from 360 to 400. The content of the olefin resin powder serving as the solid lubricant is preferably in a range of 1 to 20% by mass with respect to the total mass of the grease composition, and more preferably from 2 to 10% by mass. Excessive olefin resin powder may unfavorably increase the rotation resistances of the gears.

The grease composition according to the embodiment has a consistency ranging from 360 to 400, which is very soft. Because of the softness, a styrene thicker is preferably used for the purpose of preventing the grease composition from being dripped or scattered from the sliding part between the shaft and the inner peripheral surface of the hole of the gear, causing the gear to smoothly rotate, reducing a noise generated from the whole of the drive device, and increasing the durability. The content of the styrene thickener is preferably in a range of 1 to 20% by mass with respect to the total mass of the grease composition, and more preferably, 2 to 10% by mass. When an excessively large amount of the styrene thickener is added, the consistency cannot be adjusted in a range of 360 to 400 in a case in which the ratio of the hydrocarbon base oil to the lithium soap is in a range of 94.5:5.5 to 96.0:4.0. As a result, the rotation resistances of the gears may be further increased. When an excessively small amount of the styrene thickener is added, the expected role of the styrene thickener unfavorably may not be achieved. The expected role is to prevent the grease composition from being dripped or scattered from the sliding part between the shaft and the inner peripheral surface of the hole of the gear, cause the gear to smoothly rotate, reduce a noise generated from the whole of the drive device, and increase the durability.

The drive device according to the embodiment generates few noises and has an excellent durability, thereby making it possible to be mounted on various apparatuses. Examples of the various apparatuses include apparatuses operating in quiet offices or closed spaces or in quiet environments such as in a midnight environment, and apparatuses operating just near people. In particular, the drive device can be preferably used for image forming apparatuses (e.g., printers, facsimiles, copying machines, and multifunctional peripherals) using a heat transfer technique, a thermal technique, an inkjet technique, or an electrophotographic technique, for example, because of the following reasons. Such image forming apparatuses are widely used in homes and offices. With the progress of downsizing of the image forming apparatuses, they are installed just near users. As a result, the reduction of noises is strongly required.

At the portion in which the grease composition according to the embodiment is provided, a friction coefficient between resins, a friction coefficient between a resin and a metal or an alloy, or a friction coefficient between a metal or an alloy and a metal or an alloy preferably small over a long period. In particular, it is greatly preferable for the friction coefficient, which is obtained in the manner described below, of the grease composition using olefin resin powder to be maintained over a long period such that the friction coefficient is equal to or smaller than 0.15, preferably equal to or smaller than 0.13, and more preferably in a range of 0.01 to 0.12. The friction coefficient is measured in a range of 10 to 2000 cycles in a test in which a ball with a ½-inch diameter is slid on a plate on which a certain grease composition is applied using a reciprocating tester. In the measurement of the friction coefficient using the reciprocating tester, the measurement values of the friction coefficient can be unstable depending on the application state of the grease composition at an initial stage of the cycle (smaller than 10 cycles) in some cases. It is, thus, important that the friction coefficient is measured in a range of 10 to 2000 cycles, in which case the grease composition is in a stable application state.

Figure 5:
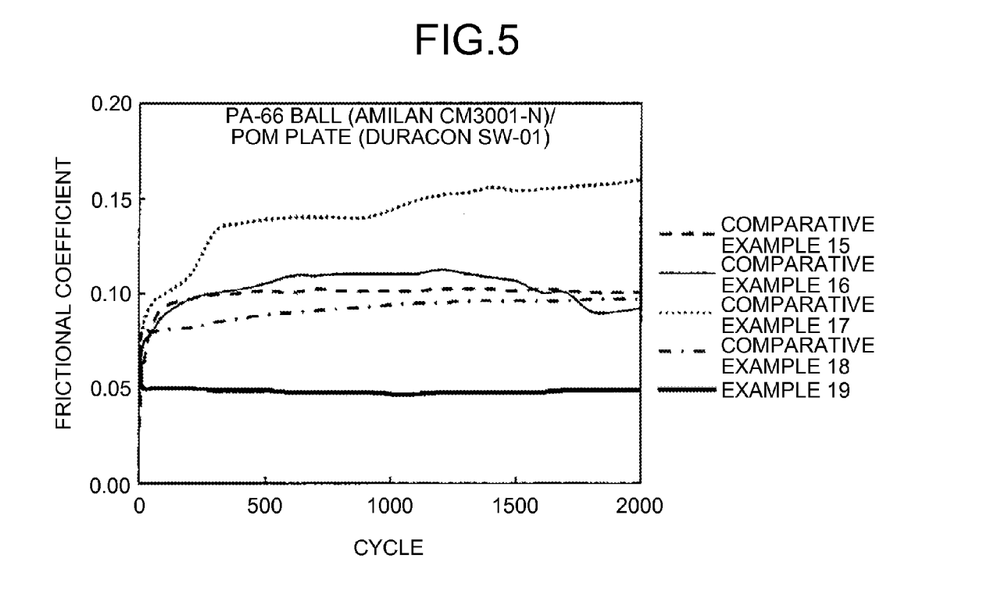
FIG. 5 is a graph illustrating a relation among types of greases, friction coefficients, and the number of friction cycles in a first test.

The friction coefficient of the grease composition using olefin resin powder according to the embodiment is small over a long period. The grease composition, thus, greatly contributes to the improvement of the reliability of the drive device. For reference, the friction coefficients of the grease composition used in example 19 (the grease composition 4 used in example 5 was used) and the grease compositions conventionally used for the drive devices of the image forming apparatus were measured using the device illustrated in FIG. 5. As illustrated in FIG. 5, the device is provided with a weight 801, a nylon 66 ball 802 with a ½-inch diameter (product name: AMILAN CM3001-N), and a load cell 805, for example. As for the conventionally used grease compositions, those in comparative example 15 (containing olefin oil, lithium soap, PTFE, and melamine cyanurate, and the consistency was 333), comparative example 16 (containing dimethyl silicone oil and lithium soap, and the consistency was 357), comparative example 17 (containing perfluoroether oil and PTFE, and the consistency was 250), and comparative example 18 (containing olefin oil and urea, and the consistency is 262) were used. The measurement was carried out as follows. Each of the grease compositions (a grease composition 803 illustrated in FIG. 5) was applied on a POM plate (DURACON SW-01) 804 with a thickness of 0.1 mm. The friction coefficient was measured when the nylon 66 ball 802 with a ½-inch diameter (product name: AMILAN CM3001-N) was slid under the conditions in which a load was 0.49 N, a sliding speed was 60 cpm, and a sliding distance was 40 mm.

FIG. 5 is a graph illustrating the measurement results of the friction coefficients. As illustrated in FIG. 5, the grease composition in Example 19 has a smaller friction coefficient than the friction coefficients of those in Comparative examples 15, 16, 17, and 18, which are conventionally used. The friction coefficient of the grease composition in Example 19 is less fluctuated and stable over the friction cycles.

Figure 6:
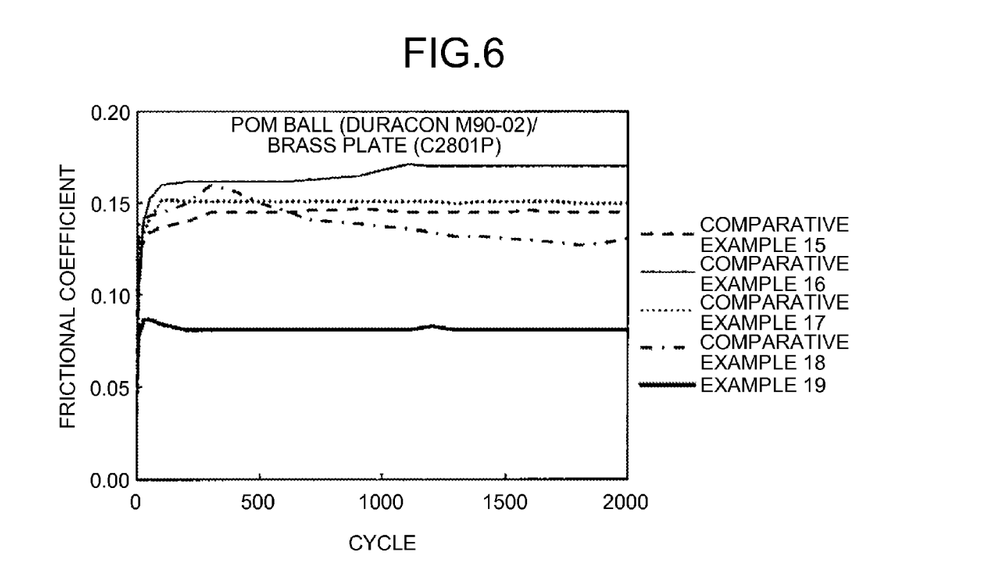
FIG. 6 is a graph illustrating a relation among types of greases, friction coefficients, and the number of friction cycles in a second test.

Then, the friction coefficients were measured in the same manner as described above except that a brass plate (C2801P) was used instead of the POM plate (DURACON SW-01) 804, and a POM ball (DURACON M90-02) was used instead of the nylon 66 ball 802 with a ½-inch diameter (AMILAN CM3001-N). FIG. 6 is a graph illustrating the measurement results of the friction coefficients. As illustrated in FIG. 6, the grease composition in Example 19 has a smaller friction coefficient than the friction coefficients of those in Comparative examples 15, 16, 17, and 18, which are conventionally used. The friction coefficient of the grease composition in Example 19 is less fluctuated and stable over the friction cycles.

Figure 7:
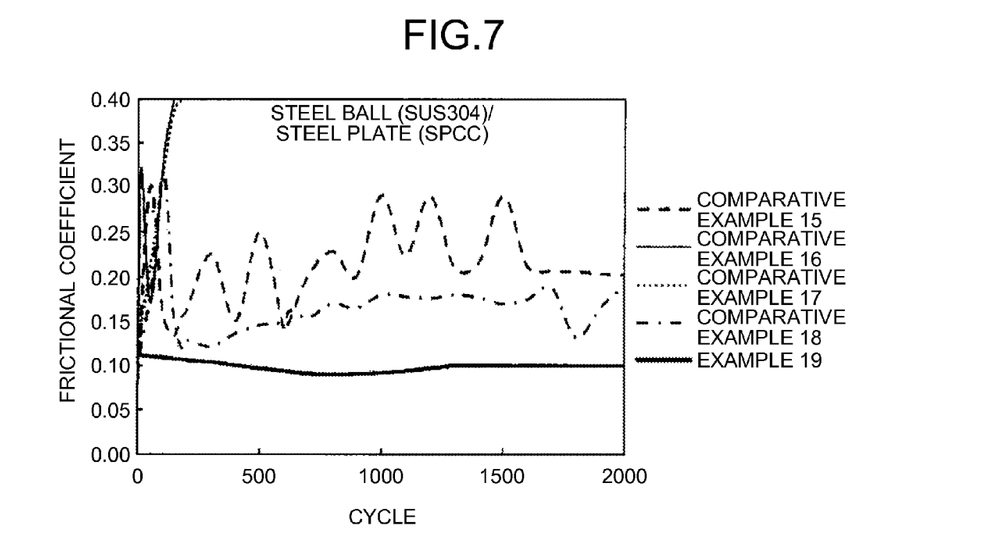
FIG. 7 is a graph illustrating a relation among types of greases, friction coefficients, and the number of friction cycles in a third test.
Figure 8:
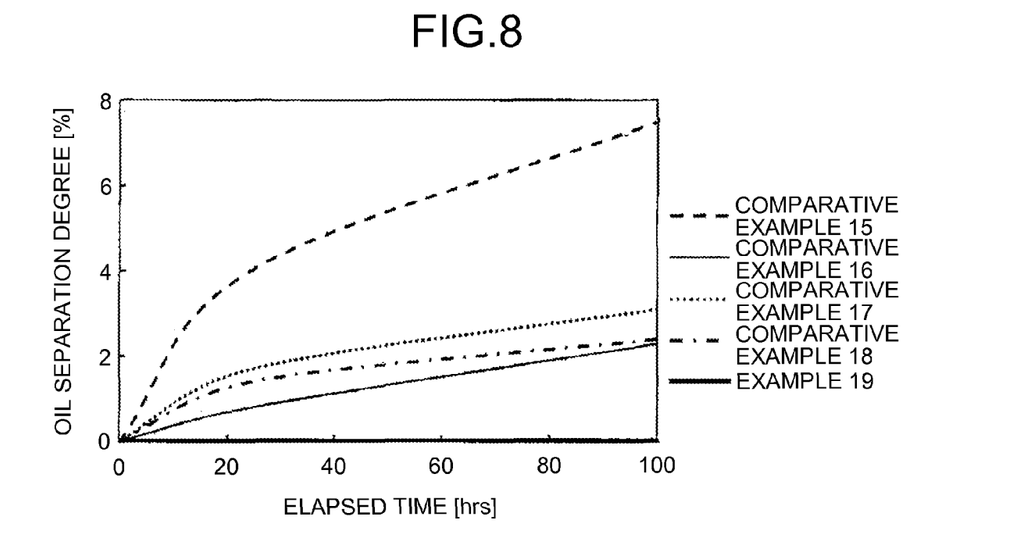
FIG. 8 is a graph illustrating a relation among types of greases, oil separation degrees, and elapsed time in a fourth test.

The friction coefficients were measured in the same manner as described above except that a steel plate (SPCC) was used instead of the POM plate (DURACON SW-01) 804 and a steel ball (SUS 304, which is a stainless steel) was used instead of the nylon 66 ball 802 with a ½-inch diameter (AMILAN CM3001-N). FIG. 7 is a graph illustrating the measurement results of the friction coefficients. As illustrated in FIG. 7, the grease composition in Example 19 has a smaller friction coefficient than the friction coefficients of those in Comparative examples 15, 16, 17, and 18, which are conventionally used. The friction coefficient of the grease composition in Example 19 is less fluctuated and stable over the friction cycles.

The grease composition according to the embodiment has excellent storage conservation. In particular, the grease composition using the styrene thickener according to the embodiment has a very small oil separation degree measured in accordance with JIS K2220. The oil separation degree can be reduced to equal to or smaller than 0.2%, preferably equal to or smaller than 0.15%, and more preferably equal to or smaller than 0.1%. In this way, the grease composition according to the embodiment has excellent storage conservation and stability. The grease composition using the styrene thickener according to the embodiment greatly contributes to the improvement of the reliability of the drive device.

For reference, aging of the oil separation degrees of the grease composition according to the embodiment (that in Example 19) and the grease compositions in Comparative examples 15, 16, 17, and 18 was measured. Specifically, the aging of the oil separation degrees was measured by an oil separation degree measurement method in accordance with JIS K2220 at 100° C. for 100 hours. FIG. 9 is a graph illustrating the measurement results of the aging. The grease composition in Example 19 has a smaller aging change in oil separation degree than the aging changes in oil separation degree of those in Examples 15, 16, 17, and 18. The oil separation degree of the grease composition in Example 19 does not change at 100° C. for 100 hours practically. The grease composition in Example 19 thus has excellent storage conservation and stability.

The following describes an image forming apparatus, on which the multiple drive devices according to the present invention are mounted, according to the embodiment. The image forming apparatus, which can demonstrate an exceptional effect of reducing a noise, according to the embodiment is an example of the image forming apparatus according to the present invention. The image forming apparatus according to the present invention is not limited to the image forming apparatus according to the embodiment.

Figure 3:
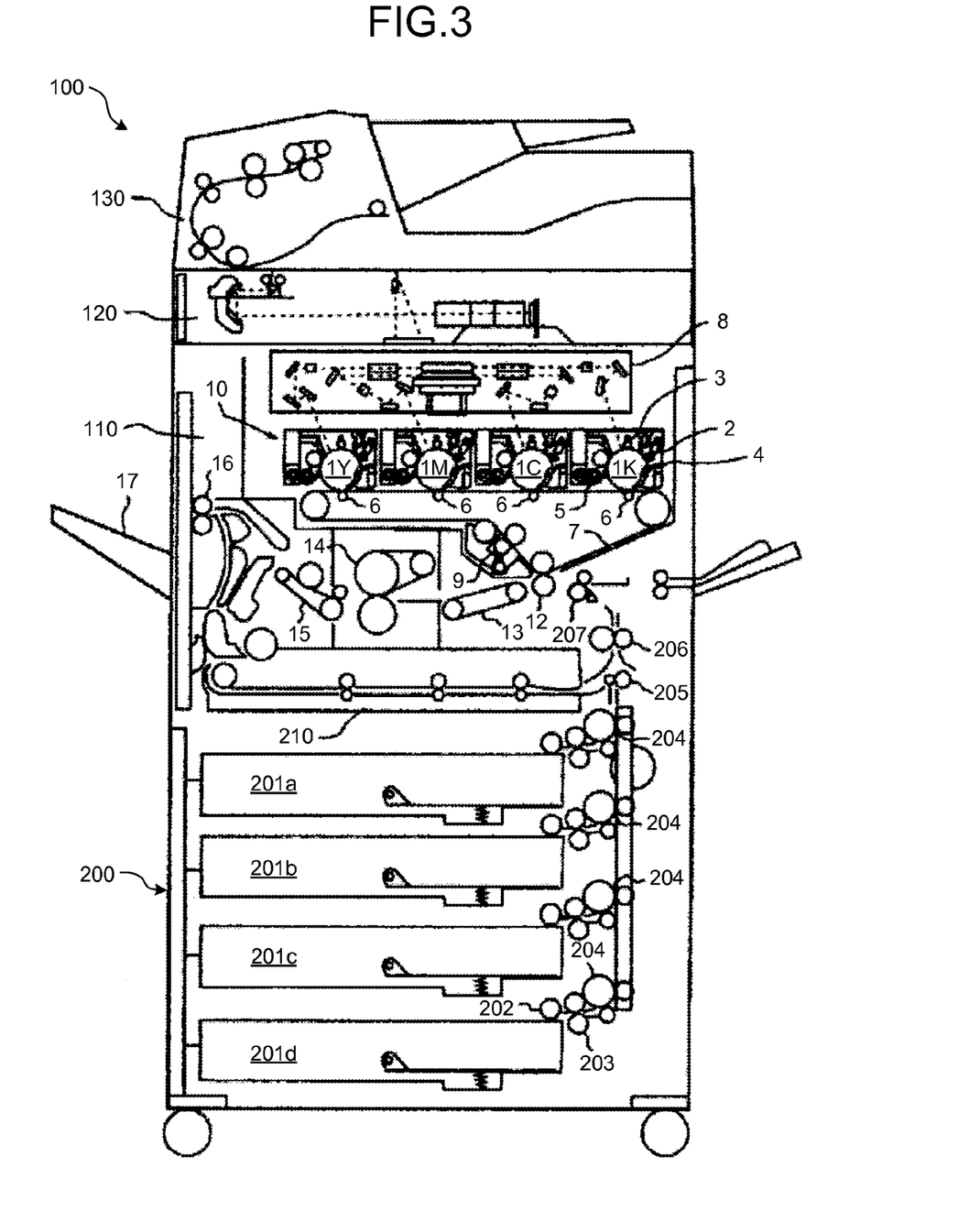
FIG. 3 is a schematic structural diagram illustrating an image forming apparatus according to the embodiment.
Figure 4:
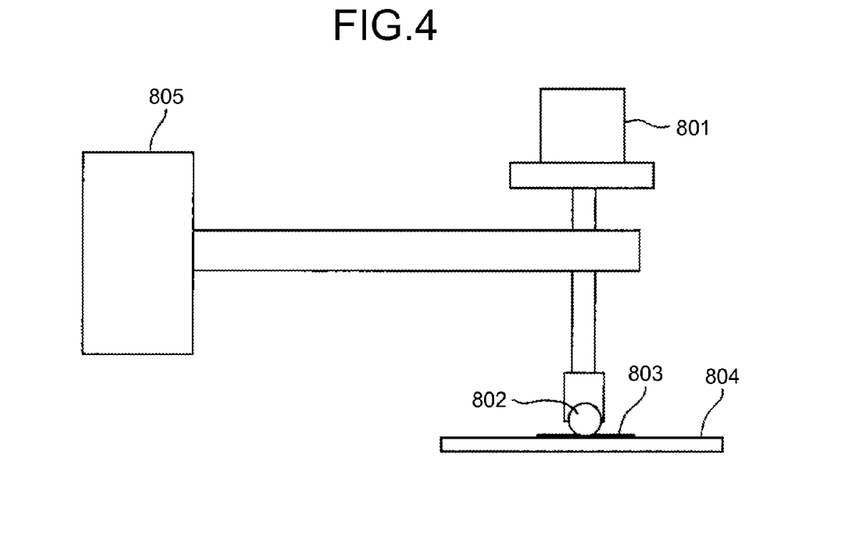
FIG. 4 is a schematic structural diagram illustrating a device used for measuring a friction coefficient.

FIG. 3 is a schematic structural diagram illustrating an image forming apparatus 100 according to the embodiment. The image forming apparatus 100 includes a body (printer unit) 110 that performs image formation, a document reader (scanner unit) 120 that is provided above the body 110, an automatic document feeder (ADF) 130 provided above the document reader 120, and a paper feeding unit 200 provided under the body 110, and has a function of a copying machine. The image forming apparatus 100 has a function to communicate with external apparatuses. The image forming apparatus 100 can be used as a printer or a scanner by being connected to an external apparatus such as a personal computer. In addition, the image forming apparatus 100 can be used as a facsimile by being connected to a telephone line or an optical communication line.

In the body 110, four image forming units (image forming stations) 10 are disposed side by side. The image forming units 10 have the same structure and use different toner colors from each other. The four image forming units 10 form different color toner images from each other using toner of the respective different colors (e.g., yellow (Y), magenta (M), cyan (C), and black (K)). Color toner images are transferred onto an intermediate transfer medium 7 to overlap one another, thereby making it possible to form a multi-color or full color image.

The four image forming units 10 are disposed side by side along the intermediate transfer medium 7 that has a belt shape and is stretched by a plurality of rollers. The respective color toner images formed by the image forming units 10 are sequentially transferred onto the intermediate transfer medium 7 to overlap one another. Thereafter, the overlapped toner images are transferred at once by a secondary transfer device 12 onto a transfer medium having a sheet shape such as paper.

The four image forming units 10 each include, around respective drum-shaped photoconductors 1 (1Y, 1M, 1C, and 1K), a protective agent application device 2, a charging device 3, an exposure unit that guides writing light (e.g., laser light) emitted from a latent image forming device 8 to the corresponding photoconductor 1, a developing device 5, a primary transfer device 6, and a cleaning device 4. The image forming units 10 for the respective colors each have a process cartridge that houses the photoconductor 1, the protective agent application device 2 (including the cleaning device 4), the charging device 3, and the developing device 5 in a common cartridge. The process cartridges are attached to the body 110 in a detachable manner.

The following describes the operation of the image forming apparatus 100. A series of processes for image forming is described in a negative-positive process as an example. The four image forming units 10 operate in the same manner, and the operation of one of the image forming units 10 is described as an example.

The drum-shaped photoconductor 1, which is an image bearer typified by an organic photo conductor (OFC) having an organic photoconductive layer, is neutralized by a discharge lamp (not illustrated), for example, and thereafter is uniformly charged to a minus polarity by the charging device 3 having a charging member (e.g., a charging roller). When the photoconductor 1 is charged by the charging device 3, a charging voltage appropriate for charging the photoconductor 1 to a desired potential is applied to the charging member from a voltage applying mechanism (not illustrated). The charging voltage has an appropriate magnitude or is the voltage in which an alternating voltage is superimposed on the voltage.

The charged photoconductor 1 is optically scanned by laser light emitted from the latent image forming device 8 employing a laser scanning technique. The latent image forming device 8 includes a plurality of laser light sources, a coupling optical system, a light deflector, and a scanning imaging forming optical system, for example. The area exposed by the optical scanning in the entire surface of the photoconductor 1 forms an electrostatic latent image (the absolute value of the potential of the exposed area is smaller than the absolute value of the potential of the unexposed area). Laser light emitted from the laser light source (e.g., a semiconductor laser) is deflected by the light deflector including a polygon mirror having a polygonal shape and rotating at a high speed for scanning, and scans the surface of the photoconductor 1 in a rotational axis direction (main-scanning direction) of the photoconductor 1 through the scanning imaging forming optical system including a scanning lens and mirrors.

The latent image thus formed on the surface of the photoconductor 1 is developed with toner particles or a developer including a mixture of toner particles and carrier particles carried on a developing sleeve of a developing roller 51 serving as a developer bearer of the developing device 5. As a result, a toner image is formed. When the latent image is being developed, a developing bias is applied to the developing sleeve of the developing device 51 from the voltage applying mechanism (not illustrated). The developing bias is a voltage having an appropriate magnitude the value of which is between those of the exposed area and the unexposed area of the photoconductor 1 or a bias in which an alternating voltage is superimposed on the voltage.

The toner images formed on the respective photoconductors 1 of the image forming units 10 for respective colors are sequentially primarily transferred onto the intermediate transfer medium 7 to overlap one another by the primary transfer device 6 including transfer rollers. In synchronization with the image forming operation and the primary transfer operation, any one cassette is selected out of paper feeding cassettes 201a, 201b, 201c, and 201d, which are arranged in multiple steps in the paper feeding unit 200. From the selected paper feeding cassette, a transfer medium having a sheet shape such as paper is fed by a paper feeding mechanism including a paper feeding roller 202 and separation rollers 203, and conveyed to a secondary transfer unit through conveyance rollers 204, 205, and 206, and registration rollers 207.

In the secondary transfer unit, the toner image on the intermediate transfer medium 7 is secondarily transferred onto the transfer medium conveyed to the second transfer unit by a secondary transfer device (e.g., secondary transfer rollers) 12. In the transfer process, a potential having the polarity opposite to the polarity of the charged toner is preferably applied to the primary transfer device 6 and the secondary transfer device 12 as a transfer bias.

After passing through the secondary transfer unit, the transfer medium is separated from the intermediate transfer medium 7. Toner particles remaining on the photoconductor 1 after the primary transfer is collected by a cleaning member 41 of the cleaning device 4 into a toner collection chamber in the cleaning device 4. Toner particles remaining on the intermediate transfer medium 7 after the secondary transfer are collected by a cleaning member of a belt cleaning device 9 into a toner collection chamber in the belt cleaning device 9.

The image forming apparatus 100 has what is called a tandem structure, in which the multi image forming units 10 for the respective colors are disposed along the intermediate transfer medium 7, and forms an image on the transfer medium by an intermediate transfer technique. As already described above, the toner images of different colors from each other formed on the respective photoconductors 1 (1Y, 1M, 1C, and 1K) of the image forming units 10 for respective colors are sequentially transferred onto the intermediate transfer medium 7 to overlap one another, and thereafter the overlapped toner images are transferred at once onto the transfer medium such as transfer paper. The transfer medium after the transfer is conveyed by a conveyance device 13 to a fixing device 14, in which the toner images are fixed on the transfer medium by heat, for example. After passing through the fixing device 14, the transfer medium is ejected by the conveyance device 15 and paper ejection rollers 16 into a paper ejection tray 17.

The image forming apparatus 100 has a both-side printing function. In both-side printing, the transfer medium only on one surface of which an image is fixed is conveyed to a conveyance device 210 for both-side printing by changing a conveyance path downstream from the fixing device 14. The conveyance device 210 for both-side printing inverts the front and rear surfaces of the transfer medium. Thereafter, the transfer medium is conveyed to the second transfer unit again by the conveyance rollers 206 and the registration rollers 207. The secondary transfer unit secondarily transfers an image onto the rear surface (the other surface) of the transfer medium. Thereafter, the transfer medium is conveyed to the fixing device 14 again. The fixing device 14 fixes the image on the rear surface of the transfer medium. Then, the transfer medium is conveyed to the paper ejection tray 17 so as to be ejected outside the image forming apparatus.

Instead of the tandem intermediate transfer system, a tandem direct transfer system may be employed. In this case, a transfer belt or the like that carries and conveys the transfer medium is used instead of the intermediate transfer medium 7. The toner images of different colors from each other sequentially formed on the respective photoconductors 1 (1Y, 1M, 1C, and 1K) of the four image forming units 10 are transferred onto the transfer medium on the transfer belt to directly overlap one another. The transfer medium is, then, conveyed to the fixing device 14, in which an image is fixed on the transfer medium by heat, for example.

The image forming apparatus thus structured includes a plurality of drive devices each of which individually drive the photoconductor 1, the cleaning device 4, and the developing device 5, the primary transfer device 6, the driving rollers that endlessly convey the intermediate transfer medium 7 while stretching it, and various conveyance rollers. The drive device according to the embodiment is employed as at least one of the multiple drive devices. In the fixing device 14, in which heat is generated, a different drive device from the drive device according to the embodiment is used because the grease softened by heat may flow out, for example.

The above descriptions are represented by way of example. The present invention also has particular advantages in the following aspects.

Aspect A

Aspect A provides a drive device that includes a gear having a hole (for example, the gear 301), a shaft that passes through the hole (for example, the shaft 302), and a grease composition that is held in a clearance between the shaft and the inner peripheral surface of the hole. The gear rotates on a peripheral surface of the shaft, and at least one of the gear and the shaft is made of a resin. The clearance is in a range of 10 to 110 µm, and the grease composition contains a hydrocarbon base oil and lithium soap serving as a thickener. A weight ratio of the hydrocarbon base oil to the lithium soap (hydrocarbon base oil : lithium soap) is adjusted in a range of 94.5:5.5 to 96.0:4.0, and consistency of the grease composition is adjusted in a range of 360 to 400.

In this structure, the clearance between the shaft and the inner peripheral surface of the hole of the gear is set to an appropriate value, and the grease composition in which the weight ratio of the hydrocarbon base oil to the lithium soap and the consistency are adjusted to the appropriate ranges is present in the clearance, thereby making it possible to prevent the occurrence of a noise while maintaining the smooth rotation of the gear on the peripheral surface of the shaft.

Aspect B

Aspect B provides the drive device according to Aspect A, wherein the shaft is made of a metal (including an alloy). In this structure, the shaft passing through the hole of the gear is made of a metal, thereby making it possible to make the one strong and prolong the lifetime. Furthermore, even when the gear through which the shaft passes is made of a resin that achieves a light weight and a low production cost, the occurrence of a noise can be effectively prevented.

Aspect C

Aspect C provides the drive device according to Aspect B, wherein the shaft is made of a stainless steel or a free-cutting steel. This structure can prevent the occurrence of a noise even when the shaft made of a stainless steel or a free-cutting steel having a high strength is used.

Aspect D

Aspect D provides the drive device according to any one of Aspects A to C, wherein the gear is made of a polyacetal resin. This structure can prevent the occurrence of a noise even when the gear rotating on the peripheral surface of the shaft made of a polyacetal resin achieving a light weight and a low production cost is used.

Aspect E

Aspect E provides the drive device according to any one of Aspects A to D, wherein the kinematic viscosity of the hydrocarbon base oil is equal to or smaller than 20 mm$^2$/s at 40° C. This structure makes it possible to rotate the gear smoothly by fully providing the grease composition containing the hydrocarbon base oil having a kinetic viscosity of equal to or smaller than 20 mm$^2$/s at 40° C. between the shaft and the inner peripheral surface of the hole of the gear. As a result, the occurrence of a noise can be effectively prevented.

Aspect F

Aspect F provides the drive device according to any one of Aspects A to D, wherein the grease composition contains olefin resin powder. This structure can efficiently prevent the occurrence of a noise by uniformly providing the olefin resin powder, which is well dispersed in the hydrocarbon base oil, between the shaft and the inner peripheral surface of the hole of the gear.

Aspect G

Aspect G provides the drive device according to any one of Aspects A to F further including a grease composition held by a tooth flank of the gear and a tooth flank of another gear engaged with the former gear. The grease composition contains a hydrocarbon base oil and lithium soap serving as a thickener. A weight ratio of the hydrocarbon base oil to the lithium soap (hydrocarbon base oil:lithium soap) is adjusted in a range of 94.5:5.5 to 96.0:4.0, and a consistency of the grease composition is adjusted in a range of 360 to 400. This structure can improve an assembly workability of the drive device (avoid the grease composition from being applied to a wrong place) using the grease composition having the same formulation for the grease composition that is provided between the shaft and the inner peripheral surface of the hole of the gear, and between the tooth flank of the gear and the tooth flank of the other gear engaged with the former gear. As a result, the productivity of the drive device can be increased.

Aspect H

Aspect H provides the drive device according to any one of Aspects A to G, wherein the grease composition held in the clearance contains a styrene thickener. The styrene thickener contained in the grease composition prevents oil separation from occurring in the grease composition. This structure can prevent the occurrence of a noise while avoiding malfunctions due to oil separation.

Aspect I

Aspect I provides an image forming apparatus including the drive device according to any one of Aspects A to H.

Aspect J

Aspect J provides a grease composition used for the drive device according to any one of Aspects A to H. This structure makes it possible for the grease composition to effectively prevent the occurrence of a noise from the drive device.

The present invention has an advantageous effect of preventing the occurrence of a noise while maintaining a smooth rotation of the gear rotating on the peripheral surface of the shaft passing through the hole of the gear.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

7: intermediate transfer medium
10: image forming unit
100: image forming apparatus
110: body
120: document reader
130: ADF
301: gear
302: shaft

What is claimed is:

1. A drive device comprising:
   a gear, a hole being present in the gear;
   a shaft, configured to pass through the hole; and
   a grease composition, in a clearance between the shaft and an inner peripheral surface of the hole, wherein
   the gear is configured to rotate on a peripheral surface of the shaft,
   at least one of the gear and the shaft being made of a resin,
   the clearance is in a range of 10 to 110 μm,
   the grease composition includes a hydrocarbon base oil and lithium soap,
   a weight ratio of the hydrocarbon base oil to the lithium soap is in a range of 94.5:5.5 to 96.0:4.0, and
   a consistency of the grease composition is in a range of 360 to 400, wherein the grease composition includes olefin resin powder as a solid lubricant, and wherein the olefin resin powder is a polyethylene powder.

2. The drive device according to claim 1, wherein shaft is made of a stainless steel or a free-cutting steel.

3. The drive device according to claim 1, wherein the gear is made of a polyacetal resin.

4. The drive device according to claim 1, wherein a kinematic viscosity of the hydrocarbon base oil is equal to or smaller than 20 mm$^2$/s at 40° C.

5. The drive device according to claim 1, wherein the grease composition held in the clearance contains a styrene thickener.

6. An image forming apparatus comprising:
   the drive device according to claim 1.

7. The drive device according to claim 1, wherein the shaft is made of a metal or an alloy.

8. The drive device according to claim 1, further comprising:
   a plurality of gears, the plurality of gears including the gear; and
   a grease composition, held on a tooth flank of one of the plurality of gears, wherein a tooth flank of another of the plurality of gears is engaged with the one of the plurality of gears.

9. The drive device according to claim 1, wherein the grease composition includes olefin resin powder that is substantially insoluble in the base oil.

10. The drive device according to claim 1, wherein the grease composition includes olefin resin powder that is dispersed in the base oil as solid particles.

* * * * *

UNITED STATES PATENT AND TRADEMARK OFFICE
CERTIFICATE OF CORRECTION

PATENT NO. : 9,951,862 B2
APPLICATION NO. : 14/719471
DATED : April 24, 2018
INVENTOR(S) : Toshiyuki Kabata et al.

It is certified that error appears in the above-identified patent and that said Letters Patent is hereby corrected as shown below:

On the Title Page

Item (73) should read:
(73) Assignee: RICOH COMPANY, LIMITED
Tokyo (JP)
DOW CORNING TORAY CO., LTD.
Tokyo (JP)

Signed and Sealed this
Twenty-eighth Day of May, 2019

Andrei Iancu
*Director of the United States Patent and Trademark Office*